(12) United States Patent
Valenzuela-Rivas et al.

(10) Patent No.: US 11,796,952 B2
(45) Date of Patent: Oct. 24, 2023

(54) AUTOMATIC DOCUMENT FEEDER WITH AUTOMATED MEDIA TRAY EXTENDER

(71) Applicant: Hewlett-Packard Development Company, L.P., Spring, TX (US)

(72) Inventors: Rene O. Valenzuela-Rivas, San Diego, CA (US); Ryan M. Smith, San Diego, CA (US); Nash S. Stanton, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/298,565

(22) PCT Filed: Apr. 30, 2019

(86) PCT No.: PCT/US2019/029974
§ 371 (c)(1),
(2) Date: May 29, 2021

(87) PCT Pub. No.: WO2020/222814
PCT Pub. Date: Nov. 5, 2020

(65) Prior Publication Data
US 2022/0350285 A1    Nov. 3, 2022

(51) Int. Cl.
*G03G 15/00*    (2006.01)
*B65H 1/04*    (2006.01)
*B65H 31/02*    (2006.01)

(52) U.S. Cl.
CPC ............. *G03G 15/602* (2013.01); *B65H 1/04* (2013.01); *B65H 31/02* (2013.01);
(Continued)

(58) Field of Classification Search
CPC ........ G03G 15/602; B65H 1/40; B65H 31/02; B65H 2406/11161; B65H 2511/51; B65H 2511/515
See application file for complete search history.

(56) References Cited

U.S. PATENT DOCUMENTS 4,085,929 A    4/1978 Tuchiya et al.
4,440,387 A    4/1984 Ikoma et al.
(Continued)

FOREIGN PATENT DOCUMENTS

CN    1522867 A    8/2004
CN    101221396 A    7/2008
(Continued)

OTHER PUBLICATIONS

"Original Tray Pre-rise Setting: Adjusting the Original Tray Standby Position on the ADF," Konica Minolta, retrieved at https://manuals.konicaminolta.eu/ineo-plus-2060L-2060-2070/EN/contents/id06-_102708692.html, retrieved on Nov. 19, 2018, 2 pages.

*Primary Examiner* — David H Banh
(74) *Attorney, Agent, or Firm* — Brooks, Cameron & Huebsch, PLLC

(57) ABSTRACT

An automatic document feeder includes a media path to route media through the automatic document feeder, at least one media tray to one of supply the media to the media path and receive the media from the media path, and an automated media tray extender at an end of the media tray, the automated media tray extender to be positioned based on a presence of the media in the media tray.

16 Claims, 7 Drawing Sheets

(52) U.S. Cl.
CPC . *B65H 2405/11161* (2013.01); *B65H 2511/51* (2013.01); *B65H 2511/515* (2013.01)

(56) References Cited

U.S. PATENT DOCUMENTS

| | | | |
|---|---|---|---|
| 4,486,015 A | 12/1984 | Takahashi | |
| 4,887,133 A | 12/1989 | Ikeda et al. | |
| 5,284,335 A | 2/1994 | Golicz | |
| 5,430,536 A | 7/1995 | Fullerton et al. | |
| 5,501,445 A | 3/1996 | Lowman et al. | |
| 5,513,017 A | 4/1996 | Knodt et al. | |
| 5,746,528 A | 5/1998 | Mayer et al. | |
| 5,760,919 A | 6/1998 | Acquaviva et al. | |
| 5,832,356 A | 11/1998 | Kurando et al. | |
| 5,897,113 A | 4/1999 | Kondo et al. | |
| 5,956,161 A | 9/1999 | Takashimizu et al. | |
| 6,073,925 A | 6/2000 | Sato | |
| 6,095,517 A | 8/2000 | Dinatale | |
| 6,128,455 A | 10/2000 | Horiguchi et al. | |
| RE37,157 E | 5/2001 | Ikeda et al. | |
| 6,350,072 B1 | 2/2002 | Nunes et al. | |
| 6,577,825 B1 | 6/2003 | Gonnella et al. | |
| 6,641,132 B2 | 11/2003 | Sekine | |
| 7,139,108 B2 | 11/2006 | Andersen et al. | |
| 7,222,955 B2 | 5/2007 | Ohashi et al. | |
| 7,242,901 B2 | 7/2007 | Oya et al. | |
| 7,395,026 B2 | 7/2008 | Seo et al. | |
| 7,461,837 B2 | 12/2008 | Saito et al. | |
| 7,661,675 B2 | 2/2010 | Lan et al. | |
| 7,731,179 B2 | 6/2010 | Izuchi et al. | |
| 7,731,184 B2 | 6/2010 | Lo et al. | |
| 7,819,395 B2 | 10/2010 | Farmer | |
| 7,905,482 B2 | 3/2011 | Matsumoto | |
| 7,963,516 B2 * | 6/2011 | Bokelman | B65H 1/04 |
| | | | 271/3.14 |
| 8,016,283 B2 | 9/2011 | Ueda et al. | |
| 8,038,143 B2 | 10/2011 | Watanabe | |
| 8,144,377 B2 | 3/2012 | Wang et al. | |
| 8,237,999 B2 | 8/2012 | Kusama | |
| 8,360,425 B2 | 1/2013 | Chng et al. | |
| 8,544,840 B2 | 10/2013 | Ng et al. | |
| 8,582,183 B2 | 11/2013 | Westcott et al. | |
| 8,585,035 B2 | 11/2013 | Ohama et al. | |
| 8,590,882 B2 | 11/2013 | Furuyama et al. | |
| 8,730,532 B2 | 5/2014 | Lee | |
| 9,116,484 B2 | 8/2015 | Masumoto et al. | |
| 9,274,480 B1 | 3/2016 | Wynn | |
| 9,670,026 B2 | 6/2017 | Watanabe et al. | |
| 9,771,133 B2 | 9/2017 | Palmer | |
| 9,771,233 B2 | 9/2017 | Miura et al. | |
| 9,781,283 B1 | 10/2017 | Wilsher et al. | |
| 2003/0038992 A1 | 2/2003 | Emmenegger et al. | |
| 2004/0022452 A1 | 2/2004 | McCoy | |
| 2004/0065132 A1 | 4/2004 | Tschesche | |
| 2004/0113352 A1 | 6/2004 | Chiang | |
| 2005/0162494 A1 * | 7/2005 | Inokuchi | B41J 11/006 |
| | | | 347/104 |
| 2006/0170950 A1 * | 8/2006 | Seike | G06K 15/00 |
| | | | 358/1.13 |
| 2007/0003339 A1 | 1/2007 | Edwards et al. | |
| 2007/0003343 A1 * | 1/2007 | Washnock | G03G 15/602 |
| | | | 399/374 |
| 2007/0013120 A1 | 1/2007 | Lo et al. | |
| 2007/0063425 A1 | 3/2007 | Tsujinishi | |
| 2007/0227332 A1 | 10/2007 | Causse et al. | |
| 2008/0037078 A1 | 2/2008 | Chen | |
| 2008/0124120 A1 | 5/2008 | Kang | |
| 2009/0010697 A1 * | 1/2009 | Nishimura | H04N 1/00551 |
| | | | 399/405 |
| 2009/0045565 A1 | 2/2009 | Edwards et al. | |
| 2009/0085277 A1 | 4/2009 | Cook et al. | |
| 2009/0213436 A1 | 8/2009 | Takuwa | |
| 2009/0278302 A1 | 11/2009 | Bokelman et al. | |
| 2010/0118327 A1 | 5/2010 | Caspar et al. | |
| 2010/0294766 A1 | 11/2010 | Wang et al. | |
| 2010/0309528 A1 | 12/2010 | Nacman et al. | |
| 2011/0142516 A1 * | 6/2011 | Uchida | B41J 3/4071 |
| | | | 399/401 |
| 2011/0188085 A1 | 8/2011 | Oosaki et al. | |
| 2012/0019874 A1 | 1/2012 | Schaertel et al. | |
| 2012/0044513 A1 | 2/2012 | Park et al. | |
| 2012/0178563 A1 | 7/2012 | Lee et al. | |
| 2012/0188617 A1 | 7/2012 | Klausbruckner | |
| 2012/0242769 A1 | 9/2012 | Murray et al. | |
| 2012/0274994 A1 | 11/2012 | Westcott et al. | |
| 2012/0274995 A1 | 11/2012 | Westcott et al. | |
| 2012/0327458 A1 | 12/2012 | Baba et al. | |
| 2013/0088762 A1 | 4/2013 | Yamazaki et al. | |
| 2014/0168717 A1 | 6/2014 | Schaertel et al. | |
| 2015/0104202 A1 | 4/2015 | Caneza et al. | |
| 2015/0304513 A1 | 10/2015 | Tu et al. | |
| 2016/0185558 A1 | 6/2016 | Kamichi | |
| 2017/0107072 A1 * | 4/2017 | Nakamura | B65H 29/14 |
| 2017/0320701 A1 * | 11/2017 | Hale | G03G 15/6514 |
| 2017/0343083 A1 | 11/2017 | Wright et al. | |
| 2018/0007221 A1 | 1/2018 | Mokuo et al. | |
| 2018/0029387 A1 * | 2/2018 | Fujino | B65H 31/02 |
| 2018/0178563 A1 * | 6/2018 | Tamai | B41J 13/106 |
| 2020/0239247 A1 * | 7/2020 | Huang | B65H 1/04 |

FOREIGN PATENT DOCUMENTS

| | | |
|---|---|---|
| CN | 102588097 A | 7/2012 |
| CN | 202784939 U | 3/2013 |
| CN | 107435714 A | 12/2017 |
| EP | 1591262 A2 | 11/2005 |
| EP | 1971121 A2 | 9/2008 |
| GB | 0836378 A | 6/1960 |
| JP | H6-148982 A | 5/1994 |
| JP | 09-258498 A | 10/1997 |
| JP | 2015-141386 A | 8/2015 |
| JP | 2016-175739 A | 10/2016 |
| JP | 2018-005197 A | 1/2018 |
| TW | M406892 U | 7/2011 |
| WO | 2005/118443 A2 | 12/2005 |
| WO | 2013/008928 A1 | 1/2013 |
| WO | 2017/147251 A1 | 8/2017 |

* cited by examiner

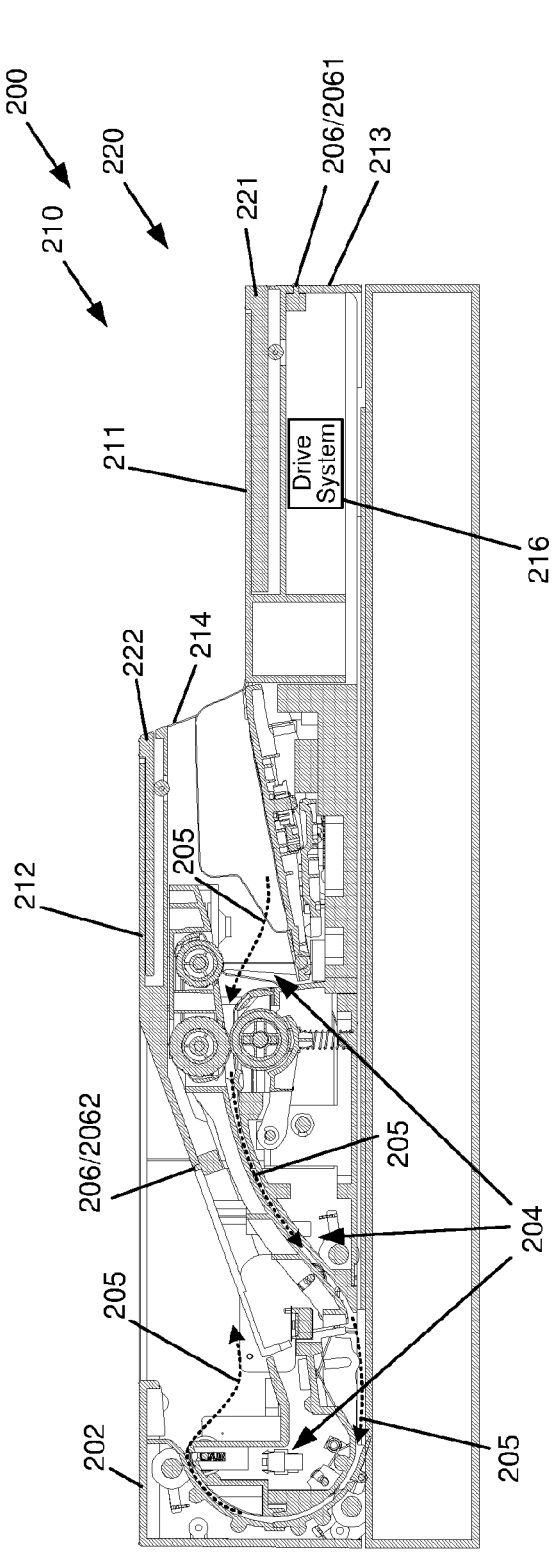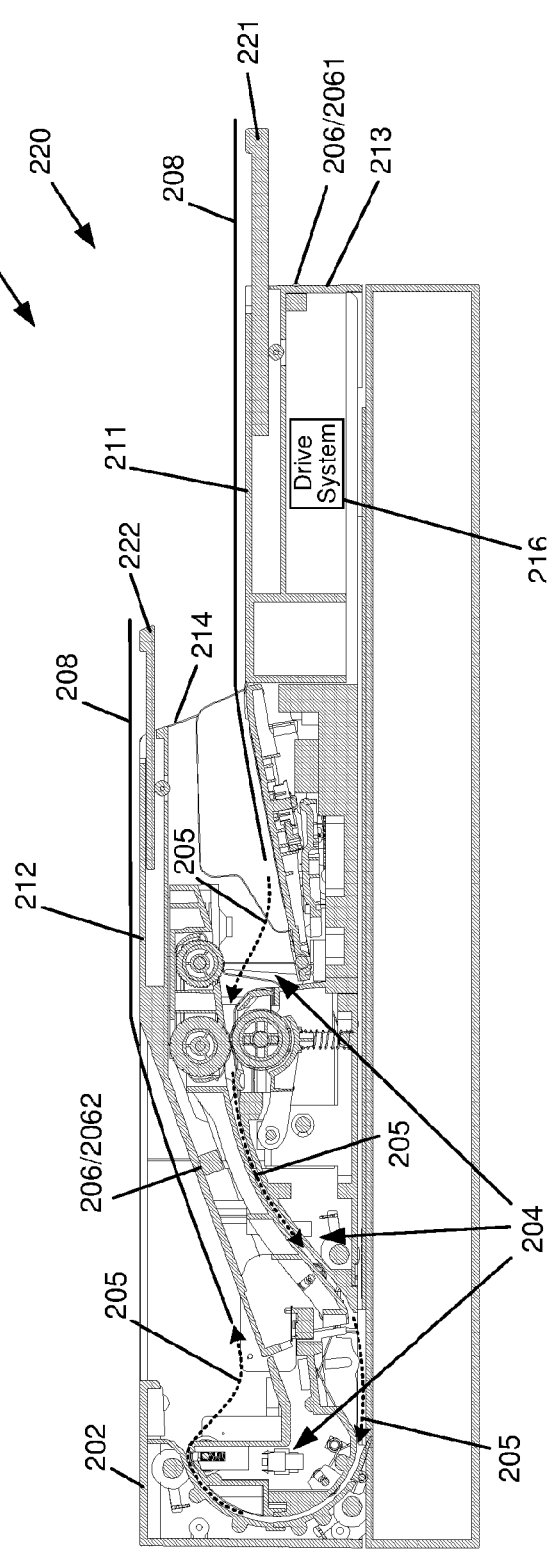

AUTOMATIC DOCUMENT FEEDER WITH AUTOMATED MEDIA TRAY EXTENDER

BACKGROUND

An automatic document feeder may be used for automatically transporting a sheet of media to an imaging or scanning position for copying, scanning, faxing, displaying on a monitor, or other processing. Thereafter, the automatic document feeder may eject the media and process a next sheet of media.

BRIEF DESCRIPTION OF THE DRAWINGS

FIGS. 4A and 4B are cross-sectional views illustrating an example of the automatic document feeder of FIGS. 3A and 3B including automated media tray extenders in a retracted position and an extended position, respectively.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure.

Figure 1A:
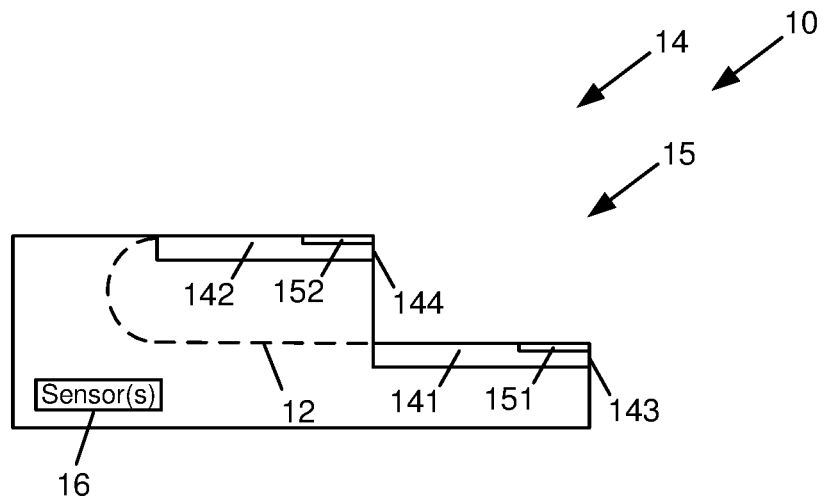
FIGS. 1A and 1B are block diagrams illustrating an example of an automatic document feeder including automated media tray extenders in a retracted position and an extended position, respectively.
Figure 1B:
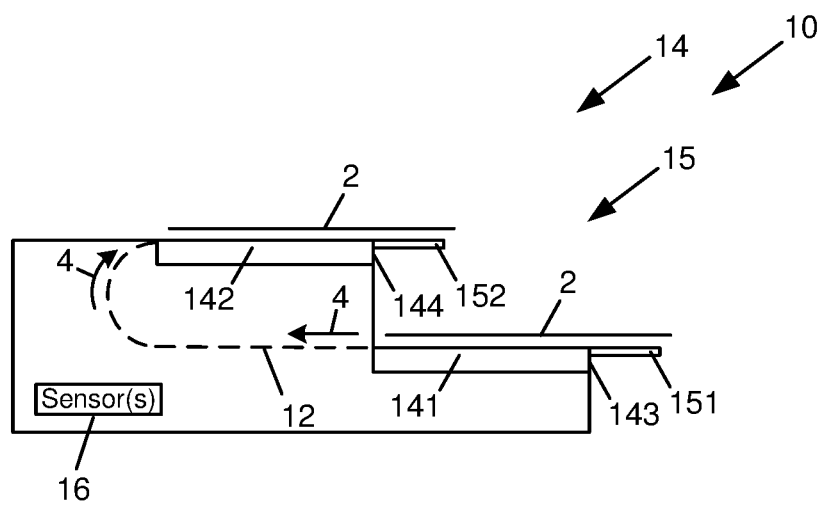

As illustrated in the example of FIGS. 1A and 1B, the present disclosure provides an automatic document feeder (ADF) 10. In one implementation, ADF 10 includes a media path 12 to route media 2 through ADF 10, as represented by arrows 4, at least one media tray 14 to supply media 2 to media path 12 or receive media 2 from media path 12, and an automated media tray extender 15 at an end of media tray 14. In examples, media tray 14 includes an input tray 141 to supply media 2 to media path 12 and an output tray 142 to receive media 2 from media path 12, and media tray extender 15 includes an input automated media tray extender 151 at an end 143 of input tray 141 and an output automated media tray extender 152 at an end 144 of output tray 142.

In examples, automated media tray extender 15, including input automated media tray extender 151 and/or output automated media tray extender 152, is to be positioned based on a presence of media 2 in media tray 14, including in input tray 141 and/or in output tray 142. For example, as illustrated in the example of FIG. 1A, without the presence of media 2 in media tray 14, automated media tray extender 15 is in a retracted position, and, as illustrated in the example of FIG. 1B, with the presence of media 2 in media tray 14, automated media tray extender 15 is in an extended position. As such, as illustrated in the example of FIG. 1A, without the presence of media 2 in media tray 14, automated media tray extender 15 is not extended (i.e., unextended or non-extended) beyond the end of media tray 14, and, as illustrated in the example of FIG. 1B, with the presence of media 2 in media tray 14, automated media tray extender 15 is extended beyond the end of media tray 14. For example, as illustrated in the example of FIG. 1A, without media in input tray 141 and/or in output tray 142, input automated media tray extender 151 is not extended beyond end 143 of input tray 141 and output automated media tray extender 152 is not extended beyond end 144 of output tray 142, and, as illustrated in the example of FIG. 1B, with media in input tray 141 and/or in output tray 142, input automated media tray extender 151 is extended beyond end 143 of input tray 141 and output automated media tray extender 152 is extended beyond end 144 of output tray 142.

In one example, ADF 10 includes a sensor 16 to sense the presence of media 2 in media tray 14, and provide input to control the position of automated media tray extender 15. In one implementation, sensor 16 includes a sensor to sense media in input tray 141 and a sensor to sense media in output tray 142.

As disclosed herein, an automatic document feeder, such as ADF 10, may be used to automatically transport media (one sheet or multiple sheets sequentially) along a media path, such as media path 12, from an input tray, as an example of media tray 14, to a scanning or imaging position, and then to an output tray, as another example of media tray 14. At the scanning or imaging position, the media may be scanned or imaged for copying, scanning, faxing, displaying on a monitor, or other processing. In examples, ADF 10 may be part of a printer, a scanner, a photocopier, a fax machine, or a multi-function or all-in-one device providing printing, scanning, copying, and/or faxing capabilities.

Figure 2:
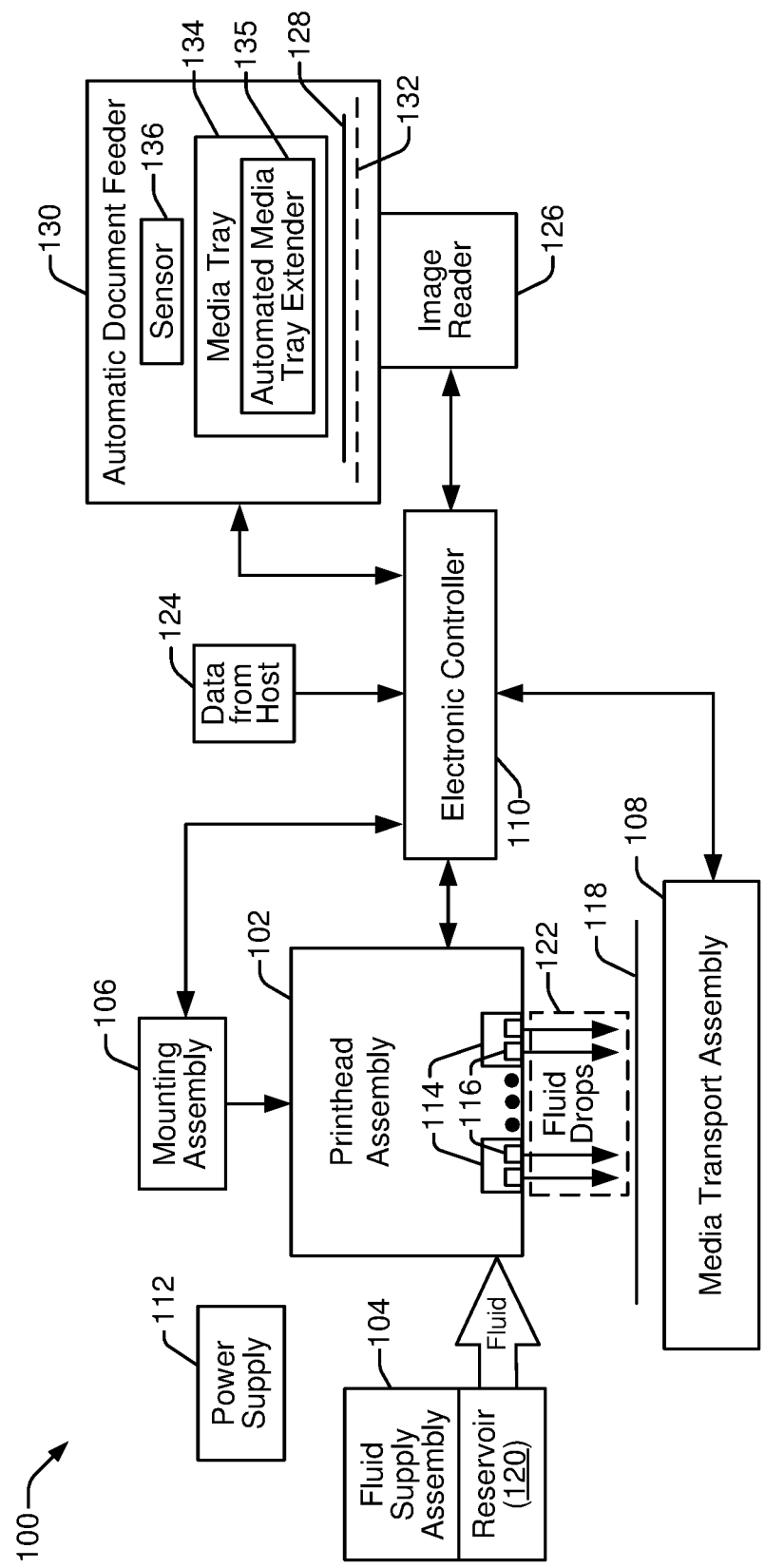
FIG. 2 is a block diagram illustrating an example of an inkjet printing system including an example of an automatic document feeder.

FIG. 2 illustrates an example of an inkjet printing system. Inkjet printing system 100 includes a printhead assembly 102, as an example of a fluid ejection assembly, a fluid (e.g., ink) supply assembly 104, a mounting assembly 106, a media transport assembly 108, an electronic controller 110, and a power supply 112 that provides power to electrical components of inkjet printing system 100. Printhead assembly 102 includes a printhead die 114, as an example of a fluid ejection die or fluid ejection device, that ejects drops of fluid through a plurality of orifices or nozzles 116 toward a print media 118 so as to print on print media 118.

Print media 118 can be any type of suitable sheet or roll material, such as paper, card stock, transparencies, Mylar, and the like, and may include rigid or semi-rigid material, such as cardboard or other panels. Nozzles 116 are arranged in columns or arrays such that properly sequenced ejection of fluid from nozzles 116 causes characters, symbols, and/or other graphics or images to be printed on print media 118 as printhead assembly 102 and print media 118 are moved relative to each other.

Fluid supply assembly 104 supplies fluid to printhead assembly 102 and, in one example, includes a reservoir 120 for storing fluid such that fluid flows from reservoir 120 to printhead assembly 102. In one example, printhead assembly 102 and fluid supply assembly 104 are housed together in an inkjet cartridge or pen. In another example, fluid supply assembly 104 is separate from printhead assembly 102 and supplies fluid to printhead assembly 102 through an interface connection, such as a supply tube.

Mounting assembly 106 positions printhead assembly 102 relative to media transport assembly 108, and media transport assembly 108 positions print media 118 relative to printhead assembly 102. Thus, a print zone 122 is defined adjacent to nozzles 116 in an area between printhead assembly 102 and print media 118. In one example, printhead assembly 102 is a scanning type printhead assembly. As such, mounting assembly 106 includes a carriage for moving printhead assembly 102 relative to media transport assembly 108 to scan print media 118. In another example, printhead assembly 102 is a non-scanning type printhead assembly. As such, mounting assembly 106 fixes printhead assembly 102 at a prescribed position relative to media transport assembly 108. Thus, media transport assembly 108 positions print media 118 relative to printhead assembly 102.

Electronic controller 110 includes a processor, firmware, software, memory components including volatile and non-volatile memory components, and other printer electronics for communicating with and controlling printhead assembly 102, mounting assembly 106, and media transport assembly 108. Electronic controller 110 receives data 124 from a host system, such as a computer, and temporarily stores data 124 in a memory. Data 124 is sent to inkjet printing system 100 along an electronic, infrared, optical, or other information transfer path. Data 124 represents, for example, a document and/or file to be printed. As such, data 124 forms a print job for inkjet printing system 100 and includes print job commands and/or command parameters.

In one example, electronic controller 110 controls printhead assembly 102 for ejection of fluid drops from nozzles 116. Thus, electronic controller 110 defines a pattern of ejected fluid drops which form characters, symbols, and/or other graphics or images on print media 118. The pattern of ejected fluid drops is determined by the print job commands and/or command parameters.

Printhead assembly 102 includes one (i.e., a single) printhead die 114 or more than one (i.e., multiple) printhead die 114. In one example, printhead assembly 102 is a wide-array or multi-head printhead assembly. In one implementation of a wide-array assembly, printhead assembly 102 includes a carrier that carries a plurality of printhead dies 114, provides electrical communication between printhead dies 114 and electronic controller 110, and provides fluidic communication between printhead dies 114 and fluid supply assembly 104.

In one example, inkjet printing system 100 is a drop-on-demand thermal inkjet printing system wherein printhead assembly 102 includes a thermal inkjet (TIJ) printhead that implements a thermal resistor as a drop ejecting element to vaporize fluid in a fluid chamber and create bubbles that force fluid drops out of nozzles 116. In another example, inkjet printing system 100 is a drop-on-demand piezoelectric inkjet printing system wherein printhead assembly 102 includes a piezoelectric inkjet (PIJ) printhead that implements a piezoelectric actuator as a drop ejecting element to generate pressure pulses that force fluid drops out of nozzles 116.

In examples, inkjet printing system 100 includes an automatic document feeder (ADF) 130, as an example of ADF 10, and an image reader 126 such that ADF 130 automatically transports media 128 along a media path 132, as an example of media path 12, to and/or past image reader 126. As such, image reader 126 may acquire and/or generate an image of a side or surface of media 128.

In one implementation, ADF 130 includes at least one media tray 134, as an example of media tray 14, to support media 128 for input to media path 132 (e.g., an input tray) and/or to receive media 128 as output from media path 132 (e.g., an output tray), and includes an automated media tray extender 135 at an end of media tray 134. In examples, automated media tray extender 135 may be automatically positioned (for example, retracted or extended, stowed or deployed) based on a presence of media 128 in media tray 134.

In examples, a presence of media 128 in media tray 134 is determined by a sensor 136. In one implementation, electronic controller 110 is communicated with ADF 130, including automated media tray extender 135. As such, electronic controller 110 controls a position of automated media tray extender 135 based on a presence of media 128 in media tray 134, as determined by sensor 136.

Figure 3A:
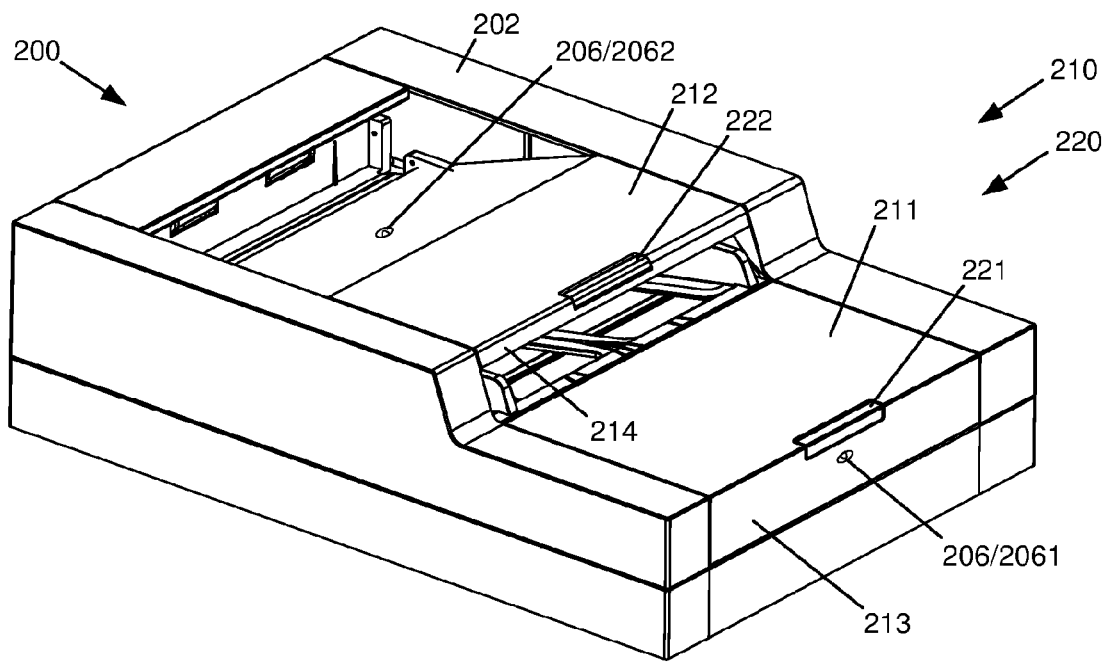
FIGS. 3A and 3B are perspective views illustrating an example of an automatic document feeder including automated media tray extenders in a retracted position and an extended position, respectively.
Figure 3B:
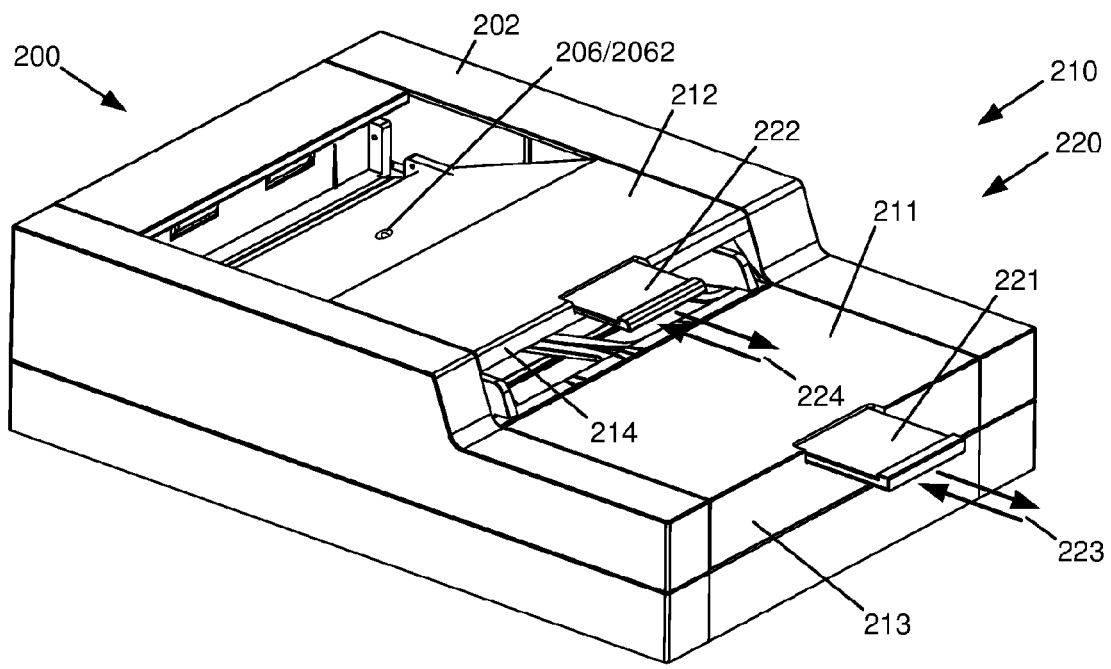

FIGS. 3A and 3B are perspective views illustrating an example of an automatic document feeder (ADF) 200, as an example of ADF 10, including media trays 210, each as an example of media tray 14, and automated media tray extenders 220, each as an example of automated media tray extender 15, with automated media tray extenders 220 in a retracted position and an extended position, respectively, and FIGS. 4A and 4B are cross-sectional views illustrating an example of ADF 200 with automated media tray extenders 220 in a retracted position and an extended position, respectively. In one implementation, as disclosed herein, automated media tray extenders 220 may be automatically positioned (e.g., moved between a first position and a second position) based on media of ADF 200. In examples, automated media tray extenders 220 may be automatically positioned based on a presence of media in media trays 210 of ADF 200.

As illustrated in the example of FIGS. 3A and 3B, 4A and 4B, ADF 200 includes a housing 202, media trays 210 supported by housing 202, and a media path 204, as an example of media path 12, within housing 202. In examples, media path 204 includes a variety of guides, rollers, wheels, etc. to achieve handling and routing of media within and/or through ADF 200, as disclosed herein.

In one example, media trays 210 include an input tray 211 and an output tray 212 such that input tray 211 supports and supplies media for input to ADF 200, and output tray 212 receives and supports media as output from ADF 200. As illustrated in the example of FIGS. 3B and 4B, input tray 211 and output tray 212 are positioned such that input tray 211 communicates with one end of media path 204 (i.e., an input end), and output tray 212 communicates with an opposite end of media path 204 (i.e., an output end). As such, media may be routed from input tray 211 to output tray 212 along media path 204, as represented by broken line arrows 205 (FIG. 4B).

In one example, automated media tray extenders 220 include an input automated media tray extender 221 and an output automated media tray extender 222 such that input automated media tray extender 221 is provided at an end 213 of input tray 211 and output automated media tray extender 222 is provided at an end 214 of output tray 212. In examples, input automated media tray extender 221 and output automated media tray extender 222 are supported by, mounted on, or coupled with respective input tray 211 and output tray 212. In one implementation, input automated media tray extender 221 and output automated media tray extender 222 are slidably supported by, slidably mounted on, or slidably coupled with respective input tray 211 and output tray 212.

As disclosed herein, automated media tray extenders 220, including both input automated media tray extender 221 and output automated media tray extender 222, may be automatically positioned (e.g., oriented, arranged, configured, operated, actuated) to provide additional support for media in a respective media tray 210. For example, as illustrated in the examples of FIGS. 3A and 4A, automated media tray extenders 220, including both input automated media tray extender 221 and output automated media tray extender 222, are positioned so as not to extend from a respective media tray 210. More specifically, in the position of FIGS. 3A and 4A, automated media tray extenders 220 are in a retracted or stowed position (collectively referred to herein as a "retracted position" for simplicity) such that automated media tray extenders 220 are not extended beyond a respective media tray 210 (i.e., are nonextended or unextended from a respective media tray 210). In addition, as illustrated in the examples of FIGS. 3B and 4B, automated media tray extenders 220, including both input automated media tray extender 221 and output automated media tray extender 222, are positioned so as to extend from a respective media tray 210. More specifically, in the position of FIGS. 3B and 4B, automated media tray extenders 220 are in an extended or deployed position (collectively referred to herein as an "extended position" for simplicity) such that automated media tray extenders 220 are extended beyond a respective media tray 210.

In one implementation, as disclosed herein, a position of automated media tray extenders 220 including, more specifically, a position of input automated media tray extender 221 and a position of output automated media tray extender 222, may be established based on a presence (or absence) of media in ADF 200, including, more specifically, a presence (or absence) of media in input tray 211 and/or a presence (or absence) of media in output tray 212. More specifically, without a presence of media in ADF 200, or with an absence of media in ADF 200, automated media tray extenders 220 may be in a retracted position, as illustrated, for example, in FIGS. 3A and 4A. As such, automated media tray extenders 220 do not extend beyond a respective media tray 210. However, with a presence of media in ADF 200, automated media tray extenders 220 may be in an extended position, as illustrated, for example, in FIGS. 3B and 4B. As such, automated media tray extenders 220 extend beyond a respective media tray 210. Thus, automated media tray extenders 220 may provide additional support to media beyond an end of a respective media tray 210.

In one implementation, a presence (or absence) of media in ADF 200, and, therefore, a position of automated media tray extenders 220, is based on media extending beyond or overhanging an end of a respective media tray 210. More specifically, in examples, when media does not extend beyond or overhang an end of a respective media tray 210 (i.e., media is less than a certain size), automated media tray extenders 220 may be in a retracted position, as illustrated, for example, in FIGS. 3A and 4A. And, in examples, when media does extend beyond or overhang an end of a respective media tray 210 (i.e., media is greater than a certain size), automated media tray extenders 220 may be in an extended position, for example, automatically moved to or changed to an extended position, as illustrated, for example, in FIGS. 3B and 4B.

In one example, a presence (or absence) of media in ADF 200 may be determined by or based on a reading of a sensor 206, as an example of sensor 136. In one implementation, sensor 206 is supported by or mounted on housing 202 of ADF 200. In examples, sensor 206 is an optical or laser-based sensor such as a time-of-flight (TOF) laser sensor, including 2D or 3D laser scanning, such as LIDAR, or other scanning, sensing and/or detection capability. In one implementation, sensor 206 is a proximity sensor.

In one implementation, sensor 206 measures or determines whether media extends beyond or overhangs a respective media tray 210. In examples, if media extends beyond or overhangs a respective media tray 210, as measured or determined, for example, by sensor 206, a presence of media in ADF 200, namely, a presence of media greater than a certain size, is established (such that automated media tray extenders 220 are in or automatically moved to or changed to the extended position). However, if media does not extend beyond or overhang a respective media tray 210, as measured or determined, for example, by sensor 206, a presence of media in ADF 200, namely, a presence of media greater than a certain size, is not established (such that automated media trays 210 are in or automatically moved to or changed to the closed position).

In one example, sensor 206 includes an input sensor 2061 and an output sensor 2062 such that input sensor 2061 is provided to sense a presence (or absence) of media in input tray 211 and output sensor 2062 is provided to sense a presence (or absence) of media in output tray 212. In one example, input sensor 2061 may determine whether media is greater than a certain size. For example, in one implementation, input sensor 2061 is provided at, near or adjacent end 213 of input tray 211. As such, input sensor 2061 may determine whether media extends beyond or overhangs end 213 of input tray 211 (and, therefore, is greater than a certain size).

In one example, the retracted position of automated media tray extenders 220 and the extended position of automated media tray extenders 220 represent different operational modes of ADF 200. More specifically, in one implementation, a retracted position of automated media tray extenders 220 represents a standby mode of ADF 200, and an extended position of automated media tray extenders 220 represents a ready or use mode of ADF 200.

In one implementation, automated media tray extenders 220, including input automated media tray extender 221 and output automated media tray extender 222, slide relative to a respective media tray 210 to establish the extended position and the retracted position. More specifically, automated media tray extenders 220 are slidably mounted in or slidably supported by a respective media tray 210. In one example, input automated media tray extender 221 is slidably mounted in or slidably supported by input tray 211 for sliding relative to input tray 211, as indicated by arrows 223, and output automated media tray extender 222 is slidably mounted in or slidably supported by output tray 212 for sliding relative to output tray 212, as indicated by arrows 224. As such, between the retracted position of FIGS. 3A and 4A and the extended position of FIGS. 3B and 4B (e.g., from the retracted position to the extended position, and/or from the extended position to the retracted position), input automated media tray extender 221 is slid in a direction indicated by arrows 223 and output automated media tray extender 222 is slid in a direction indicated by arrows 224.

In examples, ADF 200 includes a drive system 216 (FIGS. 4A and 4B) to move automated media tray extenders 220, including input automated media tray extender 221 and output automated media tray extender 222, and establish the extended position and the retracted position thereof. In implementations, drive system 216 may include, for example, a motor, solenoid or other mechanism and associated gears, guides or other components operatively connected to or coupled with input automated media tray extender 221 and output automated media tray extender 222 to move or change input automated media tray extender 221 and output automated media tray extender 222, collectively or individually, and establish the extended position and the retracted position of each.

Figure 5A:
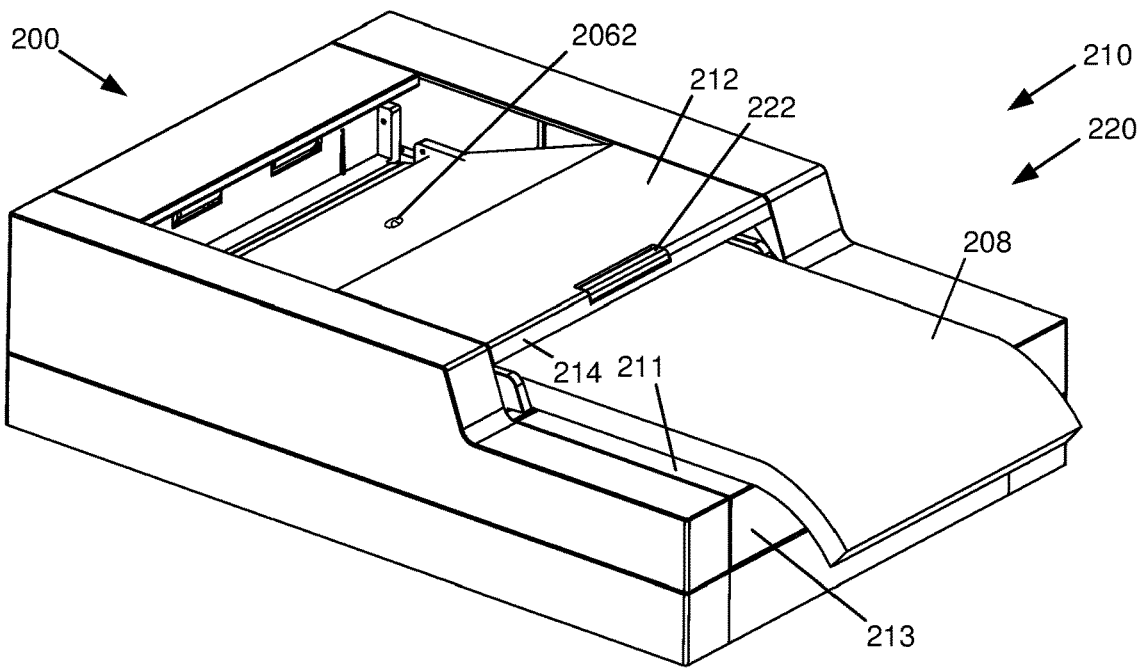
FIGS. 5A, 5B, 5C are perspective views illustrating an example of an automatic document feeder including automated media tray extenders in a retracted position and an extended position based on a presence of media in the automatic document feeder.
Figure 5B:
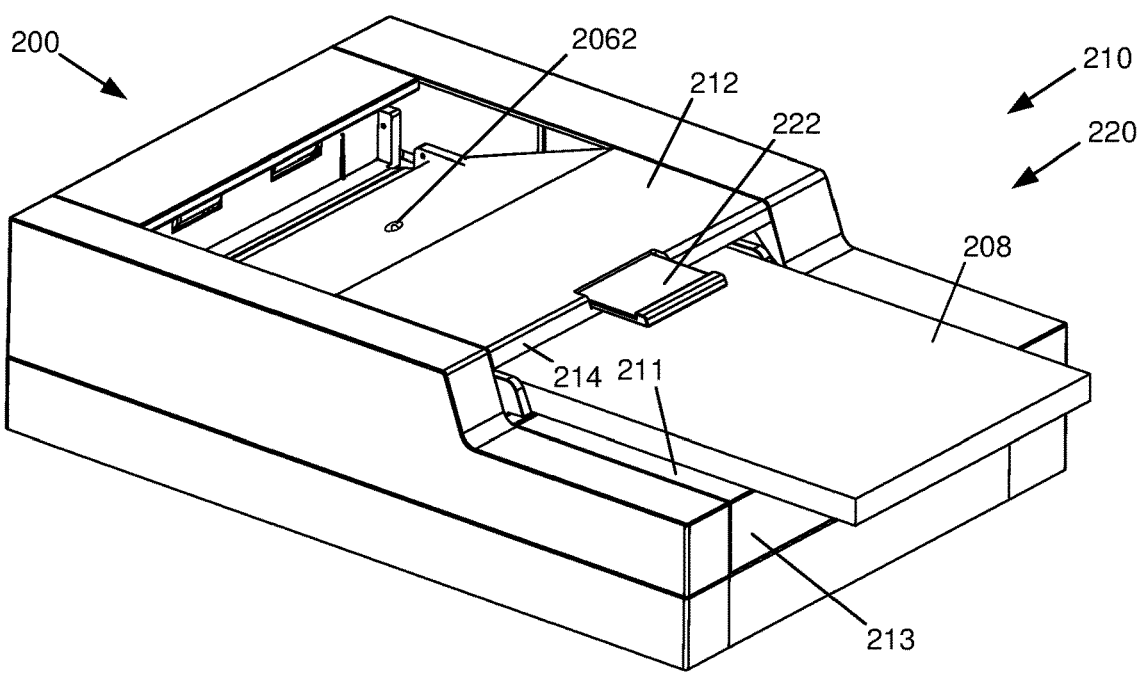
Figure 5C:
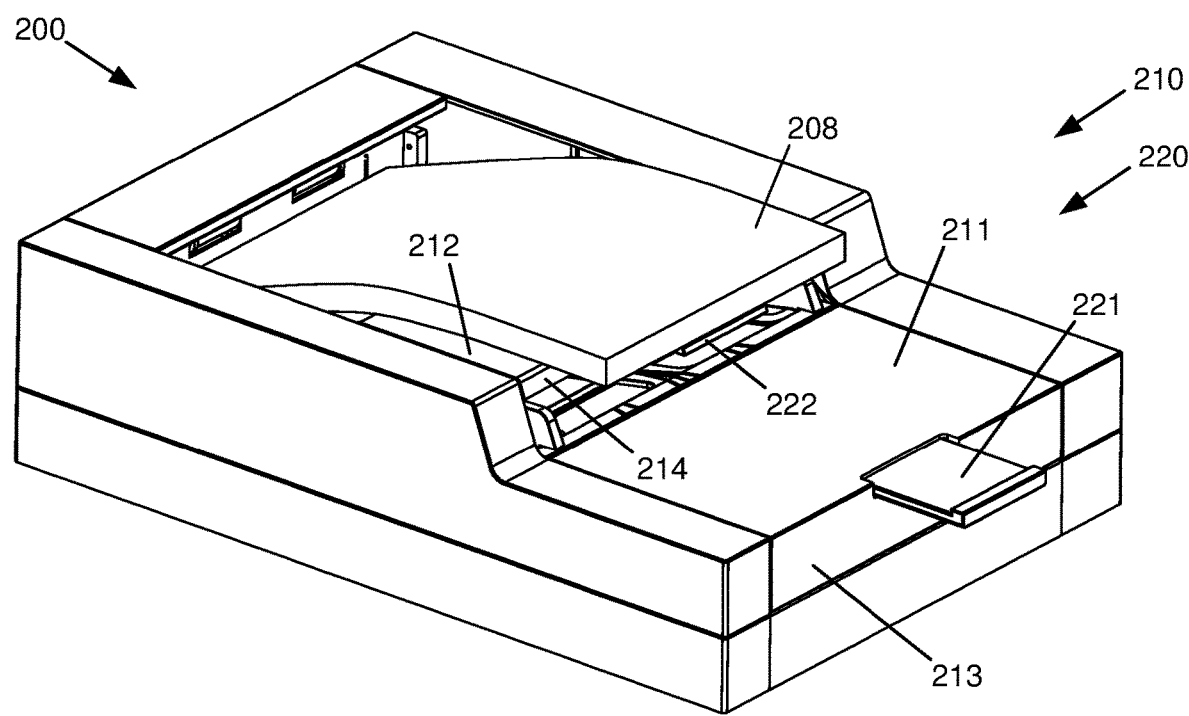

FIGS. 5A, 5B, 5C are perspective views illustrating an example of automated media tray extenders 220, including input automated media tray extender 221 and output automated media tray extender 222, in a retracted position and an extended position based on a presence of media in ADF 200.

For example, as illustrated in the example of FIG. 5A, with automated media tray extenders 220 in the retracted position (e.g., FIGS. 3A and 4A), media 208 is placed on or inserted in input tray 211. In one example, a presence of media in input tray 211, including, more specifically, a presence of media 208 extending beyond or overhanging end 213 of input tray 211, is detected, for example, by input sensor 2061 (e.g., FIG. 3A).

As such, as illustrated in the example of FIG. 5B, automated media tray extenders 220 are automatically moved to or changed to the extended position (e.g., FIGS. 3B and 4B). More specifically, in the illustrated example, input automated media tray extender 221 and output automated media tray extender 222 are extended beyond end 213 of input tray 211 and beyond end 214 of output tray 212, respectively. As such, with input automated media tray extender 221 in the extended position (e.g., FIG. 3B), input automated media tray extender 221 provides additional support to media 208, including, more specifically, a portion of media 208 extending beyond or overhanging end 213 of input tray 211.

As illustrated in the example of FIG. 5C, after media 208 is routed through ADF 200 (i.e., through media path 204), media 208 is received by output tray 212. As such, with output automated media tray extender 222 in the extended position (e.g., FIG. 3B), media 208 is supported by output tray 212 and output automated media tray extender 222. More specifically, a portion of media 208 extending beyond end 214 of output tray 212 is supported by output automated media tray extender 222.

Thereafter, when media 208 is removed from ADF 200 (e.g., removed from output tray 212), automated media tray extenders 220 are automatically moved to or changed to the retracted position (e.g., FIGS. 3A and 4A). In one example, automated media tray extenders 220 are automatically moved to or changed to the retracted position based on an absence of media in output tray 212 and input tray 211. In one implementation, an absence of media in output tray 212 is detected, for example, by output sensor 2062 (e.g., FIG. 3A) and an absence of media in input tray 211 is detected, for example, by input sensor 2061 (e.g., FIG. 3A).

In examples, if media is in input tray 211 but does not extend beyond or overhang end 213 of input tray 211, automated media tray extenders 220 may be in the retracted position (e.g., FIGS. 3A and 4A). In examples, input automated media tray extender 221 and output automated media tray extender 222 may be individually or independently moved or changed between the retracted position and the extended position. For example, if media is not in output tray 212 and, however, media is in input tray 211 and/or media is in input tray 211 and extends beyond or overhangs end 213 of input tray 211, input automated media tray extender 221 may be in or automatically moved to or changed to the extended position, while output automated media tray extender 222 is in or automatically moved to or changed to the retracted position. In addition, if media is in output tray 212 and, however, media is not in input tray 211 and/or media is in input tray 211 but does not extend beyond or overhang end 213 of input tray 211, input automated media tray extender 221 may be in or automatically moved to or changed to the retracted position, while output automated media tray extender 222 is in or automatically moved to or changed to the extended position.

Figure 6:
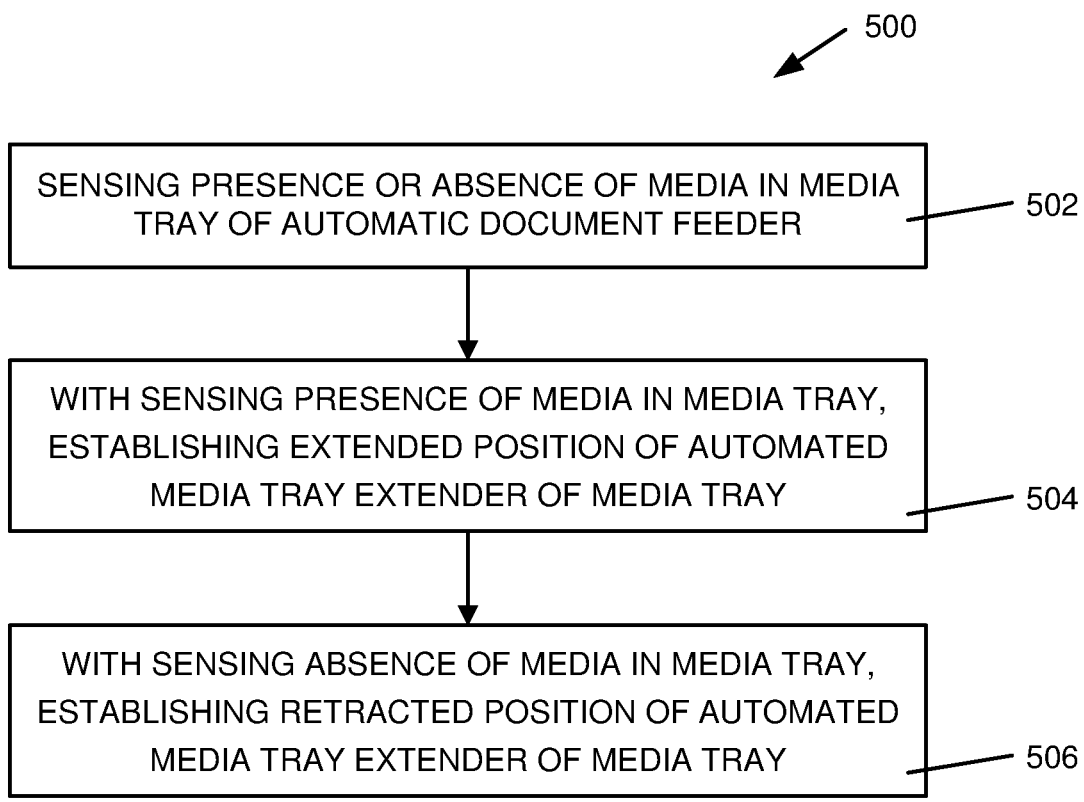
FIG. 6 is a flow diagram illustrating an example of a method of operating an automatic document feeder.

FIG. 6 is a flow diagram illustrating an example of a method 500 of operating an automatic document feeder, such as automatic document feeder 10, 130, 200, as illustrated in the examples of FIGS. 1A and 1B, FIG. 2, FIGS. 3A and 3B, 4A and 4B, 5A, 5B, and 5C, respectively.

At 502, method 500 includes sensing a presence or an absence of media in a media tray of the automatic document feeder, such as media 2, 208 in input tray 141, 211 and/or output tray 142, 212 of automatic document feeder 10, 200, as illustrated in the examples of FIGS. 1A and 1B, FIGS. 3A and 3B, 4A and 4B, 5A, 5B, and 5C, respectively.

At 504, method 500 includes, with sensing the presence of the media in the media tray, establishing an extended position of an automated media tray extender of the media tray, such as an extended position of input automated media tray extender 151, 221 of input tray 141, 211 and/or an extended position of output automated media tray extender 152, 222 of output tray 142, 212, respectively, as illustrated in the examples of FIG. 1B, FIGS. 3B, 4B, 5B, 5C, respectively.

And, at 506, method 500 includes, with sensing the absence of the media in the media tray, establishing a retracted position of the automated media tray extender of the media tray, such as a retracted position of input automated media tray extender 151, 221 of input tray 141, 211 and/or a retracted position of output automated media tray extender 152, 222 of output tray 142, 212, respectively, as illustrated in the examples of FIG. 1A, FIGS. 3A, 4A, respectively.

In one example, establishing the extended position of the automated media tray extender at 504, includes extending the automated media tray extender beyond an end of the media tray, such as extending input automated media tray extender 151, 221 beyond end 143, 213 of input tray 141, 211 and/or extending output automated media tray extender 152, 222 beyond end 144, 214 of output tray 142, 212, respectively, as illustrated in the examples of FIG. 1B, FIGS. 3B, 4B, 5B, 5C, respectively, and establishing the retracted position of the automated media tray extender at 506, includes not extending the automated media tray extender beyond the end of the media tray, such as not extending input automated media tray extender 151, 221 beyond end 143, 213 of input tray 141, 211 and/or not extending output automated media tray extender 152, 222 beyond end 144, 214 of output tray 142, 212, respectively, as illustrated in the examples of FIG. 1A, FIGS. 3A, 4A, 5A, respectively.

As disclosed herein, an automatic document feeder and method of operating an automatic document feeder includes automated extending and retracting of media tray extenders of the automatic document feeder, including automated extending and retracting of an input media tray extender and an output media tray extender of the automatic document feeder, based on a presence or an absence of media in the automatic document feeder. Automated extending and retracting of media tray extenders of the automatic document feeder, as disclosed herein, may improve user experience with the automatic document feeder, as the user will not have to manually extend and/or retract the media tray extenders. When the automatic document feeder is not in use, automated retracting of media tray extenders of the automatic document feeder, as disclosed herein, may improve the aesthetic appearance of the automatic document feeder by providing a more "sleek" or "clean" visual appearance to the automatic document feeder. In addition, automated retracting of media tray extenders of the automatic document feeder when the automatic document feeder is not in use, may help to limit damage to the media tray extenders, as the media tray extenders (or substantial portions thereof) may not protrude or extend from the automatic document feeder. Furthermore, automated extending and retracting of media tray extenders of the automatic document feeder, as disclosed herein, may be used to automatically accommodate and support multiple sizes of media.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein.

The invention claimed is:

1. An automatic document feeder, comprising:
a media path to route media through the automatic document feeder;
at least one media tray to one of supply the media to the media path and receive the media from the media path;
an end of the media tray, the end having a surface being substantially perpendicular to the media path;
a sensor located on the surface of the end of the media tray to sense a presence of media beyond the end of the media tray; and
an automated media tray extender located at the end of the media tray, the automated media tray extender to be positioned by the automatic document feeder based on a detection of the presence of the media beyond the end of the media tray by the sensor.

2. The automatic document feeder of claim 1, wherein:
with the presence of the media beyond the end of the media tray, the automated media tray extender to be in an extended position, and
without the presence of the media in the media tray, the automated media tray extender to be in a retracted position.

3. The automatic document feeder of claim 2, wherein:
in the extended position, the automated media tray extender to be extended beyond the end of the media tray, and
in the retracted position, the automated media tray extender to be unextended beyond the end of the media tray.

4. The automatic document feeder of claim 1, wherein:
the at least one media tray comprises an input tray to supply the media to the media path and an output tray to receive the media from the media path, and
the automated media tray extender comprises an input automated media tray extender at an end of the input tray and an output automated media tray extender at an end of the output tray.

5. An automatic document feeder, comprising:
an input tray to support media input to the automatic document feeder;
an end of the input tray, the end having a surface being substantially perpendicular to a media path of the automatic document feeder;
an input media sensor located on the surface of the end of the input tray to sense a presence of media beyond the end of the input tray;
an input automated media tray extender at the end of the input tray;
an output tray to support media output from the automatic document feeder; and
an output automated media tray extender at an end of the output tray,
both the input automated media tray extender and the output automated media tray extender to be stowed or deployed by the automatic document feeder based on a detection of at least one of media beyond the end of the input tray and media in the output tray.

6. The automatic document feeder of claim 5, with the media beyond the end of the input tray, both the input automated media tray extender and the output automated media tray extender to be deployed.

7. The automatic document feeder of claim 6, with the media in the output tray, both the input automated media tray extender and the output automated media tray extender to be deployed.

8. The automatic document feeder of claim 5, without the media beyond the end of the input tray and in the output tray, both the input automated media tray extender and the output automated media tray extender to be stowed.

9. The automatic document feeder of claim 8, wherein:
to be stowed, the input automated media tray extender to be unextended from the end of the input tray and the output automated media tray extender to be unextended from the end of the output tray, and
to be deployed, the input automated media tray extender to be extended from the end of the input tray and the output automated media tray extender to be extended from the end of the output tray.

10. The automatic document feeder of claim 5, further comprising:
an output media sensor to sense media in the output tray.

11. A method of operating an automatic document feeder, comprising:
sensing a presence or an absence of media beyond an end of a media tray of the automatic document feeder, the end of the media tray having:
a surface being substantially perpendicular to a media path of the automatic document feeder; and
a sensor located on the surface of the end of the media tray to sense the presence or the absence of the media beyond the end of the media tray;
with sensing the presence of the media beyond the end of the media tray, establishing, by the automatic document feeder, an extended position of an automated media tray extender of the media tray; and
with sensing the absence of the media beyond the end of the media tray, establishing, by the automatic document feeder, a retracted position of the automated media tray extender of the media tray.

12. The method of claim 11, wherein:
establishing the extended position of the automated media tray extender includes extending the automated media tray extender beyond an end of the media tray, and
establishing the retracted position of the automated media tray extender includes not extending the automated media tray extender beyond the end of the media tray.

13. The method of claim 11, wherein:
sensing the presence or the absence of the media beyond the end of the media tray comprises sensing the presence or the absence of the media beyond an end of an input tray of the automatic document feeder, and further comprising:
with sensing the presence of the media beyond the end of the input tray, establishing an extended position of an input automated media tray extender of the input tray and establishing an extended position of an output automated media tray extender of an output tray of the automatic document feeder.

14. The method of claim 13, further comprising:
sensing the presence or the absence of the media in the output tray of the automatic document feeder; and
with sensing the absence of the media beyond the end of the input tray and sensing the absence of the media in the output tray, establishing a retracted position of the input automated media tray extender of the input tray and establishing a retracted position of the output automated media tray extender of the output tray.

15. The automatic document feeder of claim 1, wherein the automated media tray extender is located at the end of the media tray above the sensor.

16. The automatic document feeder of claim 11, wherein the output media sensor is located on a surface of the output tray.

* * * * *